United States Patent
Ummadi et al.

(10) Patent No.: US 9,836,404 B2
(45) Date of Patent: Dec. 5, 2017

(54) WRITE MIRRORING TO STORAGE CLASS MEMORY DEVICES

(71) Applicant: NetApp, Inc., Sunnyvale, CA (US)

(72) Inventors: Sandeep Kumar R. Ummadi, Boulder, CO (US); Brian McKean, Boulder, CO (US); Gregory Friebus, Wichita, KS (US); Pradeep Ganesan, Wichita, KS (US)

(73) Assignee: NetApp, Inc., Sunnyvale, CA (US)

( * ) Notice: Subject to any disclaimer, the term of this patent is extended or adjusted under 35 U.S.C. 154(b) by 132 days.

(21) Appl. No.: 14/826,703

(22) Filed: Aug. 14, 2015

(65) Prior Publication Data

US 2017/0046268 A1  Feb. 16, 2017

(51) Int. Cl.
| | | |
|---|---|---|
| *G06F 12/00* | (2006.01) | |
| *G06F 12/0875* | (2016.01) | |
| *G06F 12/02* | (2006.01) | |
| *G06F 12/0802* | (2016.01) | |
| *G06F 3/06* | (2006.01) | |

(52) U.S. Cl.
CPC ........ *G06F 12/0875* (2013.01); *G06F 3/0617* (2013.01); *G06F 3/0619* (2013.01); *G06F 12/0238* (2013.01); *G06F 12/0246* (2013.01); *G06F 12/0802* (2013.01); *G06F 2212/60* (2013.01)

(58) Field of Classification Search
CPC ............. G06F 12/0875; G06F 12/0238; G06F 12/246; G06F 12/0802; G06F 2212/60; G06F 3/0617; G06F 3/0619
See application file for complete search history.

(56) References Cited

U.S. PATENT DOCUMENTS

| | | | | |
|---|---|---|---|---|
| 2006/0098519 A1* | 5/2006 | Kwon | ................. | G11C 7/1075 |
| | | | | 365/230.05 |
| 2006/0294289 A1* | 12/2006 | Ashmore | ............... | G06F 21/78 |
| | | | | 711/100 |

\* cited by examiner

*Primary Examiner* — Shawn X Gu
(74) *Attorney, Agent, or Firm* — Haynes and Boone, LLP

(57) ABSTRACT

Systems and techniques are disclosed for the mirroring of cache data from a storage controller to a storage class memory ("SCM") device. The storage controller receives a write request, caches the write data, and mirrors the write data to the SCM device instead of to a cache of another storage controller. The SCM device stores the mirrored data in the SCM device. The storage controller acknowledges the write to the host. If the storage controller later fails, an alternate controller assumes ownership of storage volumes associated with the failed controller. Upon receipt of a new read request to the failed controller, the alternate controller checks the SCM device for a cache hit. If there is, the data is read from the SCM device; otherwise, it is read from the storage volume(s). The read data is cached at the alternate controller and then sent on to the requesting host.

20 Claims, 4 Drawing Sheets

WRITE MIRRORING TO STORAGE CLASS MEMORY DEVICES

TECHNICAL FIELD

The present description relates to data storage and retrieval and, more specifically, to techniques and systems for caching data by a storage controller to storage class memory devices or other suitable non-volatile memory devices.

BACKGROUND

Networks and distributed storage allow data and storage space to be shared between devices located anywhere a connection is available. While improvements to both hardware and software have continued to provide data storage solutions that are not only faster but more reliable, device failures have not been completely eliminated. For example, even though storage controllers and storage devices have become more resilient and durable, failures may still occur. To guard against data loss, a storage system may include controller and/or storage redundancy so that, should one device fail, controller operation may continue and data may be recovered.

For example, in a high availability storage system, two storage controllers may mirror copies of their caches to the other controller's cache in order to support write back caching (to protect writes at a given controller while the data is still dirty, i.e. not committed to storage yet) and to avoid a single point of failure. The mirroring operation is a synchronous operation that contributes to system overhead during a write request. The mirroring operation can therefore consume a significant amount of bandwidth on the lines of communication between the two storage controllers. The mirroring operation also consumes system overhead of the storage controller that is the target of the mirroring operation, as it must consume resources to commit the mirrored data to its own cache. As a result, the caches of each storage controller are not fully available for their own purposes since a portion of each is reserved for mirroring purposes.

A need therefore exists for systems and techniques for managing redundant data that make efficient use of available hardware that improves write performance in a storage system while also reducing system overhead with respect to write mirroring.

BRIEF DESCRIPTION OF THE DRAWINGS

The present disclosure is best understood from the following detailed description when read with the accompanying figures.

DETAILED DESCRIPTION

Figure 1:
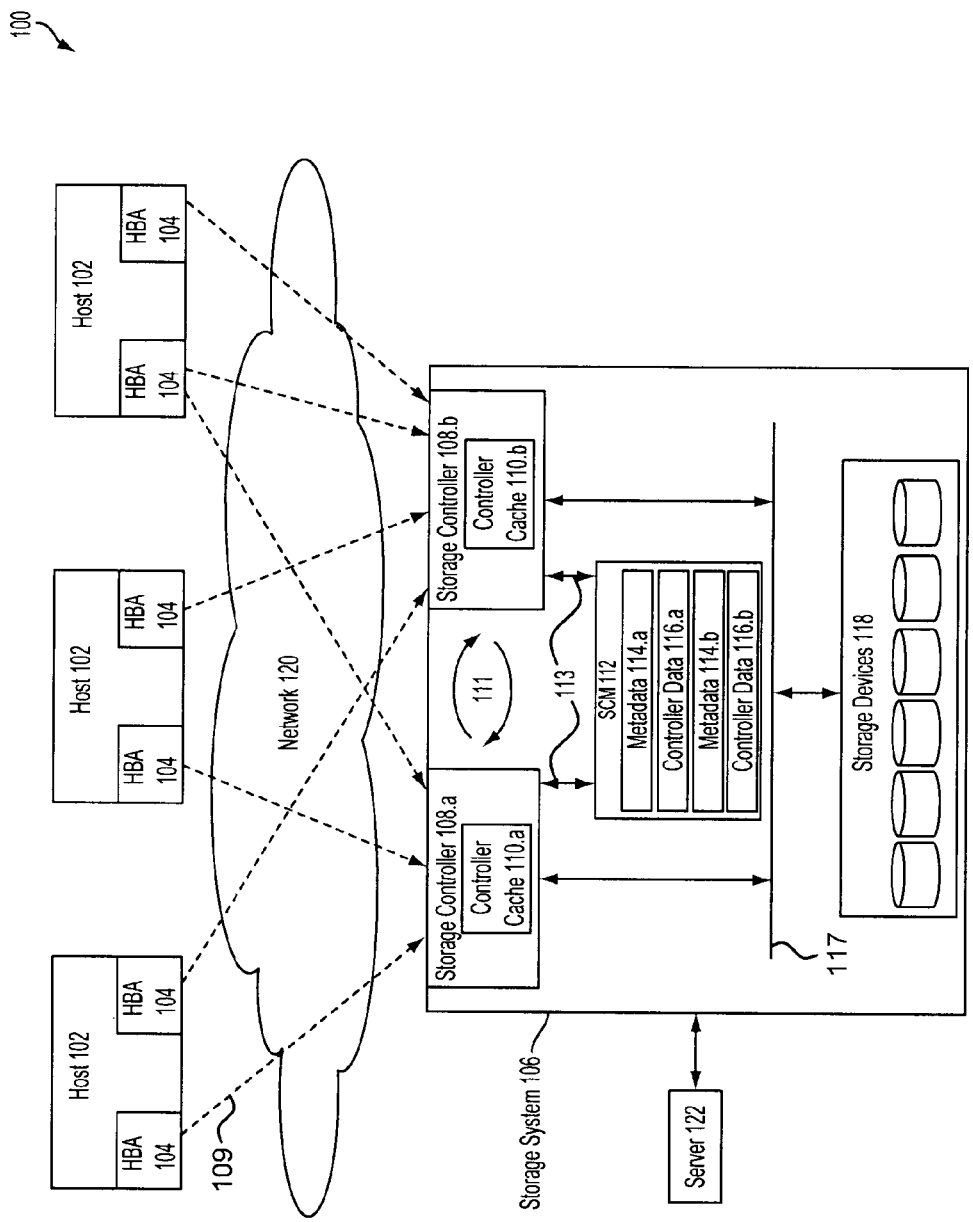
FIG. 1 is a schematic diagram of an exemplary storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments except where explicitly noted. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for the mirroring of cache data from a storage controller to a storage class memory ("SCM") device that improves the bandwidth utilization of a communication channel between storage controllers in a high availability storage system as well as frees up the amount of cache of a storage controller that is available for caching data related to the storage controller's own I/O requests. This is because the cache data is mirrored to the SCM device instead of to the cache of another storage controller.

In an embodiment, the storage controller receives a write request. The storage controller caches the write data (and any relevant metadata) and then mirrors the write data to the SCM device instead of the other storage controller. When the SCM device receives the mirrored write data, the SCM device stores the mirrored write data in a portion of the SCM device that has been reserved for the specific storage controller. After the mirrored write data has been written to the SCM device, the storage controller acknowledges the write to the requesting host.

If the storage controller later fails, the alternate storage controller can assume ownership of the storage volumes associated with the now-failed storage controller. Thereafter, when a host I/O, such as a read request for data on a storage volume previously owned by the now-failed controller, comes from a host, the alternate storage controller can receive the host I/O and proceed to check the SCM device. This is done to determine whether there is a cache hit in the contents of the portion of the SCM device that received mirrored data from the now-failed storage controller. If there is a cache hit, the alternate storage controller reads the data from the SCM device, caches it locally, and then returns the requested data to the host. After the data has been cached local to the alternate storage controller, the corresponding data may then be invalidated on the SCM device. If there was not a cache hit, then the alternate storage controller may access the data identified in the read request in the storage volume(s) and cache the output before sending on to the host.

Finally, if a controller head is swapped, this may be detected by the remaining controller. The new controller may rebuild a copy of the cache previously stored by the prior controller (which could have failed or been replaced for some other reason) by accessing the assigned portion of the SCM device that was previously associated with the replaced controller. The new controller may serve new I/O requests as the rebuild of the cache occurs.

The above features may provide multiple advantages. For example, SCM devices (and other non-volatile memories) are often much less expensive per byte and have larger capacities than a controller cache. This allows more data to be cached and more transactions to be serviced from the controller cache. In some examples, because the SCM devices are discrete and separate from the storage controllers, a controller failure will not impact the SCMs (or the mirrored data stored thereon). The SCM devices may therefore maintain the mirrored data until the failed controller can be replaced. Furthermore, in some examples, eliminating cache mirroring between storage controllers frees up processing resources on the storage controllers that can be focused on performing their own transactions. Similarly, when storage controllers are no longer tasked with mirroring transactions, the exchange of data over an inter-controller bus may be dramatically reduced and cache space in the storage controller that would conventionally be set aside for mirroring is freed up.

FIG. 1 is a schematic diagram of an exemplary storage architecture 100 according to aspects of the present disclosure. The storage architecture 100 includes a number of hosts 102 in communication with a number of storage systems 106. It is understood that for clarity and ease of explanation, only a single storage system 106 is illustrated, although any number of hosts 102 may be in communication with any number of storage systems 106. Furthermore, while the storage system 106 and each of the hosts 102 are referred to as singular entities, a storage system 106 or host 102 may include any number of computing devices and may range from a single computing system to a system cluster of any size.

Accordingly, each host 102 and storage system 106 includes at least one computing system, which in turn includes a processor such as a microcontroller or a central processing unit (CPU) operable to perform various computing instructions. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

With respect to the hosts 102, a host 102 includes any computing resource that is operable to exchange data with a storage system 106 by providing (initiating) data transactions to the storage system 106. In an exemplary embodiment, a host 102 includes a host bus adapter (HBA) 104 in communication with a storage controller 108 of the storage system 106. The HBA 104 provides an interface for communicating with the storage controller 108, and in that regard, may conform to any suitable hardware and/or software protocol. In various embodiments, the HBAs 104 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire. In the illustrated embodiment, each HBA 104 is connected to a single storage controller 108, although in other embodiments, an HBA 104 is coupled to more than one storage controller 108, illustrated in FIG. 1 as controllers 108.a and 108.b.

Communications paths between the HBAs 104 and the storage controllers 108.a, 108.b. are referred to as links 109. A link 109 may take the form of a direct connection (e.g., a single wire or other point-to-point connection), a networked connection, or any combination thereof. Thus, in some embodiments, one or more links 109 traverse a network 120, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. In embodiments, a host 102 has multiple links 109 with a single storage controller 108 for redundancy. The multiple links 109 may be provided by a single HBA 104 or multiple HBAs 104. In some embodiments, multiple links 109 may operate in parallel to increase bandwidth.

To interact with (e.g., read, write, modify, etc.) remote data, a host 102 sends one or more data transactions to the respective storage system 106 via a link 109. Data transactions are requests to read, write, or otherwise access data stored within a data storage device such as the storage system 106, and may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

The storage system 106 may also be communicatively coupled to server 122. The server 122 includes at least one computing system, which in turn includes a processor(s), for example as discussed above. The server 122 may include a general purpose computer or a special purpose computer and may be embodied, for instance, as a commodity server running a storage operating system. The computing system may also include a memory device such as one or more of those discussed above, a video controller, a network interface, and/or a user I/O interface coupled to one or more user I/O devices. While the server 122 is referred to as a singular entity, the server 122 may include any number of computing devices and may range from a single computing system to a system cluster of any size.

In an embodiment, the server 122 may also provide data transactions to the storage system 106. Thus, the server 122 may be an example of a host 102. Further, the server 122 may be used to configure various aspects of the storage system 106, for example under the direction and input of a user. In some examples, configuration is performed via a user interface, which is presented locally or remotely to a user. In other examples, configuration is performed dynamically by the server 122. Some configuration aspects may include the identification of a primary storage controller 108 and a secondary storage controller 108, as well as the definition of RAID group(s), disk pool(s), and volume(s) for the storage devices 118, to name just a few examples.

Turning now to the storage system 106, the exemplary storage system 106 contains any number of storage devices 118 and responds to data transactions of hosts 102 so that the storage devices 118 appear to be directly connected (local) to the hosts 102. The storage system 106 may group the storage devices 118 for speed and/or redundancy using a virtualization technique such as RAID (Redundant Array of Independent/Inexpensive Disks). At a high level, virtualization includes mapping physical addresses of the storage devices into a virtual address space and presenting the virtual address space to the hosts 102. In this way, the storage system 106 represents the group of devices as a single device, often referred to as a volume. Thus, a host 102 can access the volume without concern for how it is distributed among the underlying storage devices 118.

In various examples, the underlying storage devices 118 include hard disk drives (HDDs), solid state drives (SSDs), optical drives, and/or any other suitable volatile or non-volatile data storage medium. In some embodiments, the storage devices are arranged hierarchically and include a large pool of relatively slow storage devices and one or more caches (i.e., smaller memory pools typically utilizing faster storage media). Portions of the address space may be mapped to the cache so that transactions directed to mapped addresses can be serviced using the cache. Accordingly, the larger and slower memory pool may be accessed less frequently and in the background so as to improve the overall speed of the system. In an embodiment, a storage device in the larger and slower memory pool of the storage devices 118 includes HDDs, while an associated cache of the storage devices 118 includes NAND-based SSDs.

The storage system 106 also includes storage controllers 108.a, 108.b in communication with each other, for example via an inter-controller bus 111. The storage controllers 108.a, 108.b are also in communication with the storage devices 118, such as via backplane 117, and a storage class memory device ("SCM") 112 via bus 113 which may be, for example, a PCI Express (PCIe) bus, the backplane 117, or by any other suitable communication link. The storage controllers 108.a, 108.b exercise low-level control over the storage devices 118 in order to execute (perform) data transactions on behalf of the hosts 102.

In addition to data handling and processing resources, storage controller 108.a may also include controller cache 110.a and storage controller 108.b may include controller cache 110.b. Similar to a disk cache, the controller caches 110.a, 110.b may be used to store data to be written to or read from the storage devices 118. The controller caches 110.a, 110.b are typically much faster to access than the storage devices 118 and provide a mechanism for expediting data transactions. The controller caches 110.a, 110.b may include any volatile or non-volatile storage medium and common examples include battery-backed DRAM and flash memory.

As discussed above, there is a possibility that transaction may fail before it reaches the storage devices 118. Of particular concern is that the storage system 106 will report a transaction as successfully writing to the storage devices 118 before a failure occurs that prevents the write from actually occurring. To address this, certain classes of transactions, referred to herein as protected-mode transactions, guarantee that the requested changes are eventually written to the storage devices 118. To insure against failure, at least two copies of the data and/or metadata may be retained until the transaction is completed on the storage devices 118. The additional copy may be used to recover the data and recreate the transaction if it fails.

In the interest of brevity, the examples herein describe a protected-mode write transaction, although it is understood that the principles herein apply equally to any data transaction where two or more copies are retained to so that the transaction may be recovered. Further, reference will be made herein to storage controller 108.a for a data transaction, while it will be recognized that the same could occur with respect to storage controller 108.b under similar circumstances.

In a typical example, separate copies of transaction data are stored in the caches 110.a, 110.b of the two respective storage controllers 108.a, 108.b. Thus, in an embodiment, storage controller 108.a stores a copy of the data and/or metadata in its controller cache 110.a prior to performing the transaction on the storage devices 118. The storage controller 108.a may also provide the data and/or metadata to the SCM 112 over the bus 113 for storing in a portion of the SCM 112 reserved for the storage controller 108.a. This is referred to as mirroring. Accordingly, the bus 113 may be referred to as a mirror channel. In an embodiment, the bus 113 is separate from the inter-controller bus 111. In another embodiment, the bus 113 is an extension of the inter-controller bus 111. This duplication may take place before the data is written to the storage devices 118. In this way, the storage system 106 can recreate the transaction should either storage controller 108.a, 108.b fail before the write to storage devices 118 is complete.

The SCM 112 may include any suitable storage technology including resistive RAM (RRAM), phase-change RAM (PCRAM), flash memory (e.g., NAND/NOR flash memory), battery-backed DRAM, and/or other storage media. In some examples, the SCM 112 are a class of high-speed byte- or block-addressable non-volatile memory devices that utilize any of a variety of storage technologies to provide latencies an order of magnitude faster (or more) than conventional flash SSDs. The high bandwidth and low latency of SCMs make them well-suited for use as a data cache in high-performance applications, such as the storage system 106. In an embodiment, the SCM 112 may be discrete and separate from both of the storage controllers 108.a, 108.b such that the storage controller 108.a failing will not compromise the SCM 112. In an alternative embodiment, the SCM 112 may be attached in a normal data device slot if the slot is PCIe compatible, or installed in the alternate storage controller 108.b as long as the SCM 112 is addressable by both the storage controller 108.a and the alternate storage controller 108.b.

The SCM 112 may be referred to generally as a nonvolatile memory. The SCM 112 may be multi-ported, with each port directly coupled to a storage controller 108 by a suitable interface such as a PCI Express (PCIe) bus. A multi-ported SCM 112 may be capable of handling reads and writes from each coupled storage controller 108.a, 108.b concurrently, and in an exemplary embodiment, each port of the multi-ported SCM 112 has dedicated PCIe lanes coupling the SCM 112 to the respective storage controller 108.a, 108.b.

The SCM 112 may be partitioned, with each partition set aside for data or metadata associated with a particular storage controller 108.a, 108.b. In the illustrated embodiment, the SCM 112 includes two general partitions (one for each storage controller 108.a, 108.b, while each partition is illustrated as itself being partitioned between metadata and controller data portions), although it is understood that the principles herein apply to any number of partitions (e.g., 2, 4, 6, 8, 10, etc.). As illustrated, the SCM 112 includes a first partition including metadata partition 114.a and controller data partition 116.a which are both associated with the storage controller 108.a. The SCM 112 also includes a second partition including metadata partition 114.b and controller data partition 116.b. These partitions are accessible by their respective storage controllers 108.a, 108.b during normal operation. In the event of a storage controller 108 failure, the respective partition may be used by the other storage controller(s) 108 to recover data/transactions. Although illustrated as a single SCM 112 that is partitioned for use by multiple storage controllers 108, in an alternative embodiment there may be a separate SCM 112 dedicated for each storage controller 108.

In an exemplary use case, the storage controller 108.a may receive a transaction, also referred to herein as an input/output ("I/O") transaction such as a write transaction. The storage controller 108.a may, after receipt of the write transaction, cache the metadata (if any) and write data of the write transaction to the controller cache 110.a. After caching a copy of the write transaction to the controller cache 110.a, the storage controller 108.a mirrors the write transaction to the SCM 112. Specifically, the storage controller 108.a mirrors the metadata of the write transaction to the metadata cache portion 114.a and the write data of the write transaction to the controller data portion 116.a. A similar process would occur with respect to transactions directed toward the storage controller 108.b and the metadata portion 114.b/controller data portion 116.b, as will be recognized.

Once a redundant copy of the transaction's data and/or metadata has been mirrored to the appropriation portions of SCM 112, the storage system 106 may provide the initiating host 102 with a transaction completion response even if the transaction has not yet written to the targeted storage device(s) 118. To the host 102, a protected-mode transaction is not safely received until the redundant copy is made because before that point, the transaction may be lost if the storage controller 108.a fails. After the copy is made and the completion response is received, however, a host 102 application may proceed and may rely on the guarantee that the storage system 106 can recover the transaction from the duplicate copy mirrored to the SCM 112. It is understood that further embodiments expand on this redundancy by applying these principles to groups of three or more storage controllers 108 or three or more copies of the data/metadata.

While the previous examples described a storage system 106 with more than one storage controller 108, it can be seen that the use of SCM 112 provides data redundancy and protected-mode capability even for a storage system 106 with only a single storage controller 108 without departing from the scope of the present disclosure.

Figure 2:
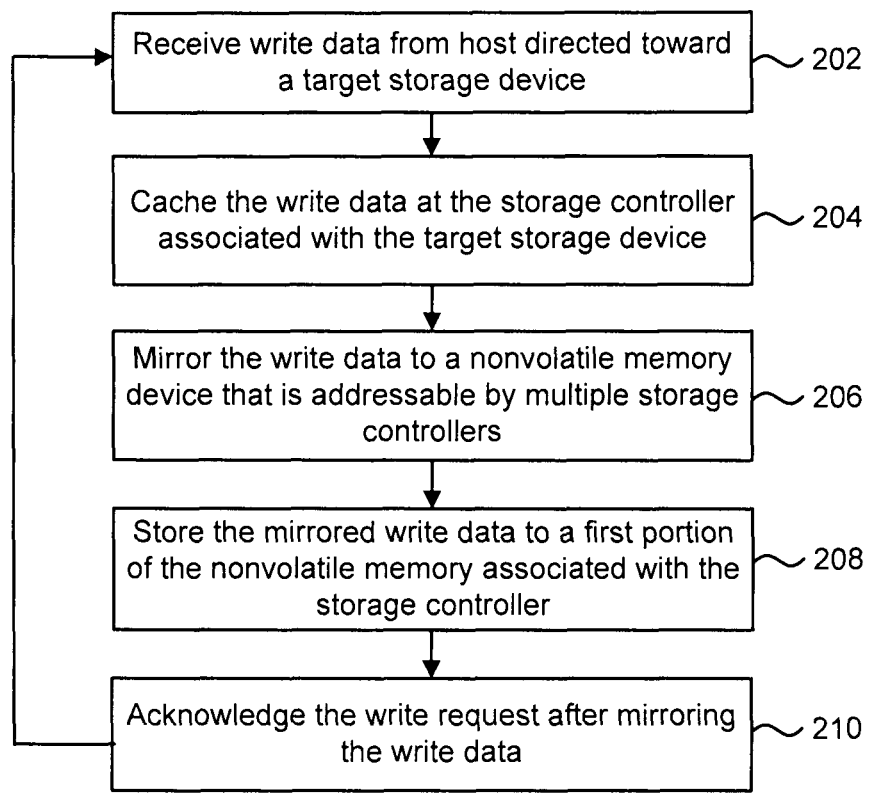
FIG. 2 is a flow diagram of an exemplary method of mirroring write data to a nonvolatile memory device according to aspects of the present disclosure.

Turning now to FIG. 2, a flow diagram of an exemplary method 200 of mirroring write data to a nonvolatile memory device, such as SCM 112 of FIG. 1, according to aspects of the present disclosure is illustrated. In an embodiment, the method 200 may be implemented by the storage controllers 108 executing computer-readable instructions to perform the functions described herein in cooperation with the rest of the storage system 106. It is understood that additional steps can be provided before, during, and after the steps of method 200, and that some of the steps described can be replaced or eliminated for other embodiments of the method 200. For simplicity, discussion will be with respect to the storage controller 108.a for a given transaction.

At block 202, the storage controller 108.a receives an I/O transaction from a host 102 that is directed toward a target range of one or more storage devices 118. The I/O transaction may include a request to read, write, or otherwise access data stored on the storage devices 118, and may contain fields that encode a command, data, metadata, and/or any other relevant information. For example, the I/O transaction received is a write transaction that includes metadata for the write as well as the write data itself.

At block 204, the storage controller 108.a writes data and/or metadata associated with the write transaction to its local controller cache 110.a. For example, storage controller 108.a may cache the write transaction (metadata and write data) in the local cache 110.a where the I/O transaction is directed toward a storage device(s) 118 over which the storage controller 108.a has ownership. In some embodiments where the storage controller 108.a receives an I/O transaction from a host 102 over which the storage controller 108.b has ownership over the target storage device(s) 118, the storage controller 108.a may transfer the I/O transaction to the storage controller 108.b via the inter-controller bus 111. In this example, however, the storage controller 108.a has ownership of the I/O transaction.

At block 206, the storage controller 108.a mirrors the I/O transaction to the SCM 112 for storage of a redundant copy of the I/O transaction now cached in the controller cache 110.a. The I/O transaction may be mirrored to the SCM 112 subsequent to, or substantially simultaneously with, storage in the controller cache 110.a. In an embodiment, the storage controller 108.a mirrors metadata associated with the write transaction to the metadata portion 114.a and the write data to the controller data portion 116.a. In another embodiment, the storage controller 108.a mirrors the write transaction to a general first portion of the SCM 112 that is partitioned for the storage controller 108.a. The metadata may be maintained as one or more recovery cache blocks ("RCB"). Because the SCM 112 may support byte addressability, the RCBs may be mirrored to the metadata portion 114.a at a byte-level granularity. The cache blocks associated with the write data itself may be mirrored at a cache block level of granularity.

At block 208, the storage controller 108.a directs the SCM 112 to store the mirrored write transaction to the portion(s) of the SCM 112 reserved for mirrored data from the storage controller 108.a.

In this manner, the storage controller 108.a maintains a mirror in the SCM 112 instead of in the controller cache 110.b of the redundant storage controller 108.b. The mirrored copies on the SCM 112 provide redundancy in the event that storage controller 108.a fails, especially while there is still dirty data in the controller cache 110.a (e.g., data that has not yet been committed to the target storage devices 118). In embodiments where the SCM 112 is multi-ported (e.g., dual-ported), each of storage controllers 108a and 108.b may write their own mirrored data to the SCM 112 concurrently. This may reduce the overhead typically associated with mirroring, improving the performance of the storage system 106, and/or prove noticeably faster than mirroring transactions to the storage controller 108.b's cache (controller cache 110.b).

At block 210, the storage controller 108.a acknowledges completion of the write request to the requesting host 102. This is done after the write transaction has been mirrored to, and stored in, the SCM 112 in the appropriate portion, but may be done before the write data is actually flushed (committed) to the target storage device(s) 118.

Figure 3:
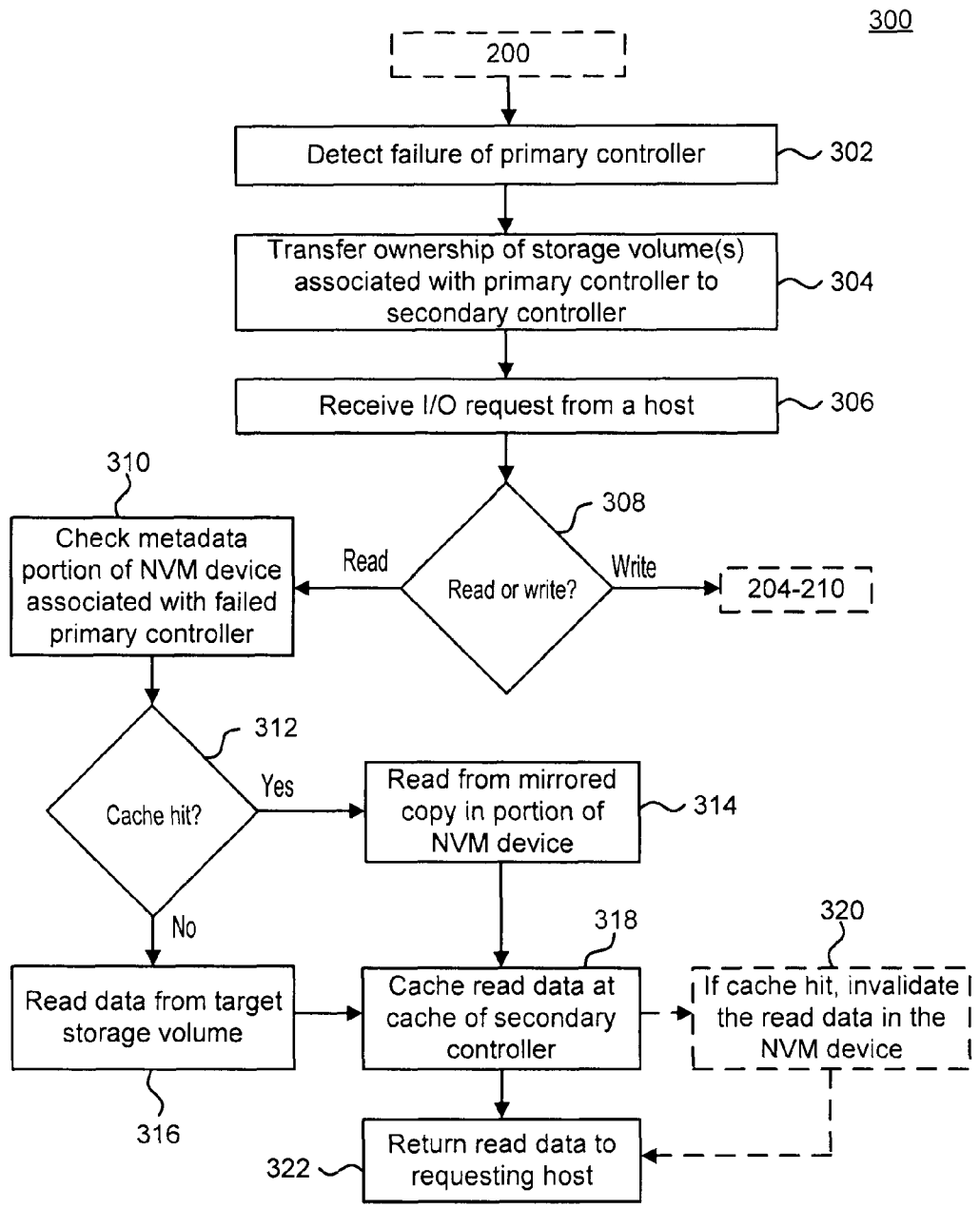
FIG. 3 is a flow diagram of an exemplary method of write data recovery during a failover and recovery process according to aspects of the present disclosure.

As I/O transactions are received at the storage controllers 108.a, 108.b and handled in the manner described above with respect to FIG. 2, the situation may occur where one of the storage controllers 108.a, 108.b fail. This situation is addressed with respect to FIG. 3, which illustrates a flow diagram of an exemplary method 300 of write data recovery during a failover and recovery process according to aspects of the present disclosure. In an embodiment, the method 300 may be implemented by the storage controllers 108 executing computer-readable instructions to perform the functions described herein in cooperation the rest of the storage system 106. It is understood that additional steps can be provided before, during, and after the steps of method 300, and that some of the steps described can be replaced or eliminated for other embodiments of the method 300. For simplicity, discussion will be with respect to the storage controller 108.a for a given transaction as a primary controller.

At block 302, storage system 106 detects the failure of the primary storage controller 108.a. For example, the storage system 106 may detect the failure of the primary storage controller 108.a by way of the storage controller 108.b. For purposes of discussion, description is made herein of a controller failure, but as will be recognized the procedure described in FIG. 3 may also apply to volume transfers between controllers more generally (e.g., absent failure of the controller with initial ownership over a given volume).

At block 304, ownership of one or more volumes that were previously owned by the now-failed storage controller 108.*a* is transferred to the alternate (also referred to sometimes as secondary or backup) storage controller 108.*b*.

After ownership has transferred to the alternate storage controller 108.*b* such that storage controller 108.*b* serves incoming host I/O transactions, at block 306 an I/O transaction is received from a host 102. For example, the I/O transaction may be received at the storage controller 108.*b* where the I/O transaction was sent to both storage controllers 108.*a*, 108.*b* from one or more HBAs 104 of a host 102, or after an original I/O transaction sent only to the failed storage controller 108.*a* timed out.

After receipt of the new I/O transaction, the method 300 proceeds to decision block 308. At decision block 308, it is determined whether the I/O transaction is a read request or a write request. If the I/O transaction is a write request, then the method 300 proceeds according to the blocks 204-210 described above with respect to FIG. 2.

If, instead, the I/O transaction is a read request, then the method 300 proceeds to block 310. At block 310, the alternate storage controller 108.*b* checks the metadata portion 114.*a* associated with the failed storage controller 108.*a* to determine whether the requested read data may be stored in the controller cache portion 116.*a* (which would be a mirrored copy of the cached read data in the now-failed storage controller 108.*a*).

At decision block 312, the storage controller 108.*b* determines whether there is a cache hit or not. This may be determined, for example, based on the results of the check performed at block 310 for metadata associated with the read request.

If metadata is found, then the storage controller 108.*b* determines that there is a cache hit and the method 300 proceeds to block 314. At block 314, the storage controller 108.*b* reads the mirrored copy of the read data from the controller data portion 116.*a*.

Returning to decision block 312, if metadata is not found, then the storage controller 108.*b* determines that there is a cache miss and the method 300 proceeds instead to block 316.

At block 316, the storage controller 108.*b* instead causes the read data to be accessed from the target storage device(s) 118 associated with the target volume(s) specified in the read transaction from the host 102.

At block 318, whether the read data is accessed from the controller data portion 116.*a* or from the storage device(s) 118, the storage controller 108.*b* caches the read data in the controller cache 110.*b*.

The method 300 may proceed to optional block 320 where there was a cache hit as determined at decision block 312. At optional block 320, the storage controller 108.*b* may cause the corresponding sections of the metadata portion 114.*a* and controller data portion 116.*a* to be invalidated. This may involve only expressly invalidating the section of the metadata portion 114.*a* associated with the contents of the read transaction, leaving the content of the read data in the controller data portion 116.*a* impliedly invalidated, or both may be expressly invalidated.

Whether from block 318 or optional block 320, the method 300 then continues to block 322, where the storage controller 108.*b* returns the read data to the requesting host.

In this manner, data integrity may be guaranteed even where a volume is transferred or a failover condition occurs (e.g., a storage controller 108 fails). In the specific case of controller failover, dirty write data that the failed controller did not commit to storage maintains its integrity because a mirrored copy remains available on the SCM 112 for the alternate controller to access and complete.

Figure 4:
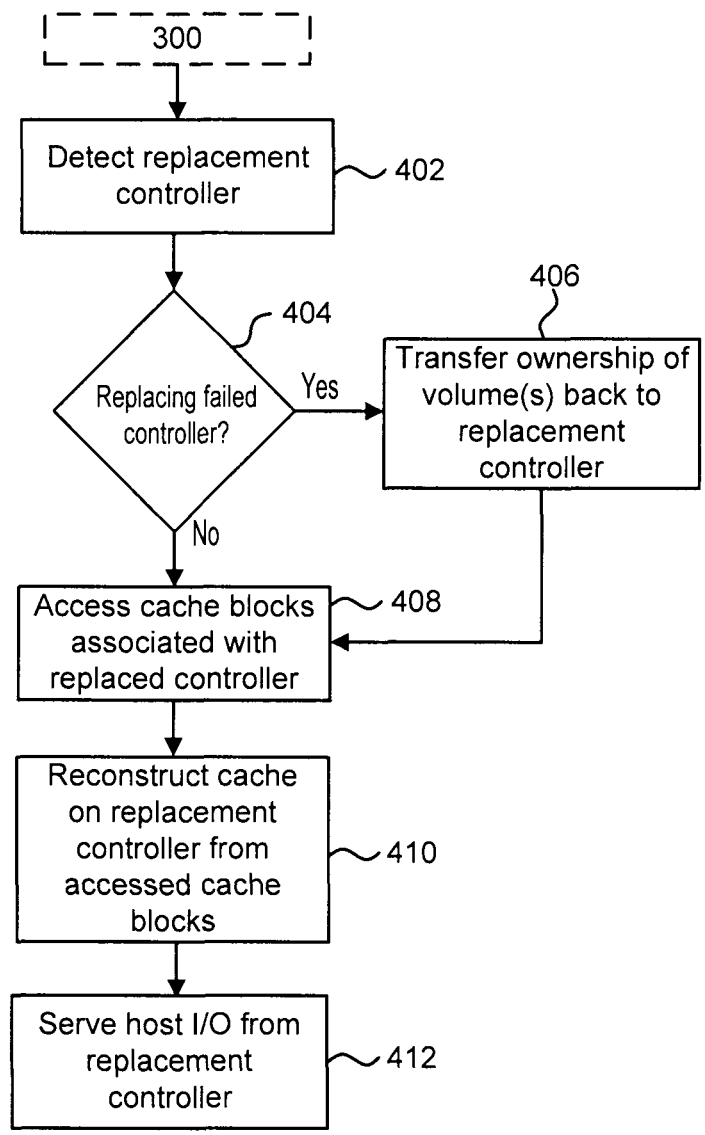
FIG. 4 is a flow diagram of an exemplary method of recovering mirrored cache data during a controller head swap according to aspects of the present disclosure.

Turning now to FIG. 4, a flow diagram of an exemplary method 400 of recovering mirrored cache data during a controller head swap according to aspects of the present disclosure is illustrated. In an embodiment, the method 400 may be implemented by the storage controllers 108 executing computer-readable instructions to perform the functions described herein in cooperation the rest of the storage system 106. It is understood that additional steps can be provided before, during, and after the steps of method 400, and that some of the steps described can be replaced or eliminated for other embodiments of the method 400. For simplicity, discussion will be with respect to the storage controller 108.*b* for a given transaction as a failover controller, as a continuation of the example given above with respect to FIG. 3.

A controller head swap may occur in a few different situations. For example, a controller may be swapped in situations where hardware is desired to be upgraded (e.g., where the controller being replaced is still operational/has not failed) or in situations where the controller being replaced has failed. In the example of FIG. 4, for simplicity of discussion the storage controller 108.*a* is being replaced (either due to failure or some other condition). Either way, since the SCM 112 maintains a mirrored copy of the cache of the controller being replaced, any dirty data does not need to be flushed to the target storage devices 118 prior to the change.

At block 402, the storage controller 108.*b* detects that a replacement controller has been installed in the storage system 106.

At decision block 404, it is determined whether the replacement controller is replacing a failed controller or not. This has relevance based at least in part on the occurrences relating to FIG. 3 above, for example the transfer of ownership of storage devices 118 previously associated with the now-failed storage controller 108.*a* potentially temporarily to the storage controller 108.*b*.

If it is determined at decision block 404 that the replacement controller is replacing storage controller 108.*a* due to failure of the storage controller 108.*a*, then the method 400 proceeds to block 406, where the storage controller 108.*b* transfers ownership of one or more storage devices 118 to the replacement controller (as the replacement for the original storage controller 108.*a*).

At block 408, the replacement controller accesses the cache blocks associated with the now-replaced storage controller 108.*a* still maintained by the SCM 112. For example, the replacement controller may access the metadata portion 114.*a* and the controller data portion 116.*a* and copy any data that has not been invalidated (see, e.g., block 320 of FIG. 3) for storage in the replacement controller's own controller cache.

Going back to decision block 404, if it is instead determined that the replacement controller is not replacing a failed controller (e.g., instead is an upgrade or other change not necessitated by controller failure), the method 400 proceeds directly to block 408.

Proceeding from block 408, at block 410 the replacement controller reconstructs the contents of the now-replaced controller 108.*a*'s cache 110.*a* in the replacement controller's own controller cache. This reconstruction occurs based on the RCBs and/or cache blocks pulled from the appropriate portion of the SCM 112.

At block 412, the replacement controller serves host I/O transactions in the place of the replaced storage controller 108.*a*. In an embodiment, the replacement controller may serve host I/O as the replacement controller's cache is being constructed without any interruption. The method 400 may be performed on storage systems 106 that are operating in either duplex or simplex mode (for example, duplex mode where a controller is functional and being replaced, or simplex mode where a controller has already failed and is now being replaced). Either way, the architecture of the storage system 106 according to embodiments of the present disclosure enables controller head swaps according to method 400 to be performed more quickly than conventionally is possible.

The present embodiments can take the form of an entirely hardware embodiment, an entirely software embodiment, or an embodiment containing both hardware and software elements. In that regard, in some embodiments, the computing system is programmable and is programmed to execute processes including those associated with the processes of methods 200, 300, and/or 400 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include be an electronic, magnetic, optical, electromagnetic, infrared, or a semiconductor system (or apparatus or device), such as non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   receiving, at a storage server, a write request with write data from a host directed toward a storage volume associated with a storage controller of the storage server;
   caching, at a cache of the storage controller, the write data in response to receiving the write request;
   mirroring, by the storage controller, the write data to a first partition of a multi-ported nonvolatile memory ("NVM") device of the storage server, the first partition comprising a metadata section and a content section, wherein the NVM device is addressable by both the storage controller and a redundant controller of the storage server, and wherein the storage controller and the redundant controller concurrently mirror data to the multi-ported NVM device; and
   storing the mirrored write data to the storage volume after the storage controller mirrors the write data to the multi-ported NVM device.

2. The method of claim 1, wherein the mirroring further comprises:
   storing second mirrored write data from the redundant controller in a second partition of the multi-ported NVM device, the first and second partitions being different from each other, wherein the second partition comprises a second metadata section and a second content section.

3. The method of claim 2, further comprising:
   transferring, in response to failure of the storage controller, ownership of the storage volume previously associated with the storage controller to the redundant controller; and
   transferring ownership of data stored in the first partition of the multi-ported NVM device to the redundant controller.

4. The method of claim 3, further comprising:
   receiving, at the redundant controller, a read request directed toward the storage volume previously associated with the storage controller; and
   serving, by the redundant controller, the read request by checking a metadata portion of the first partition of the multi-ported NVM device to determine whether there is a cache hit.

5. The method of claim 4, further comprising:
   reading, by the redundant controller, read data identified by the read request from the first partition in response to determining that there is a cache hit;
   caching, by the redundant controller, the read data at a cache of the redundant controller in response to reading the read data from the first partition of the multi-ported NVM device;
   sending, from the redundant controller, the read data in response to the read request; and
   invalidating, by the redundant controller, the read data in the first partition of the multi-ported NVM device in response to caching the read data at the cache of the redundant controller.

6. The method of claim 3, further comprising:
   receiving, at the storage server, installation of a replacement controller to replace the failed storage controller; and
   recovering, by the replacement controller, metadata and cache blocks previously associated with the failed storage controller from the first partition of the multi-ported NVM device, the recovered cache blocks comprising at least in part dirty data.

7. The method of claim 1, wherein the multi-ported NVM device is attached to the storage controller via a communications bus.

8. A computing device comprising:
   at least one memory containing machine readable medium comprising machine executable code having stored thereon instructions for performing a method of mirroring to a multi-ported NVM device; and
   at least one processor coupled to the at least one memory, the at least one processor configured to execute the machine executable code to cause the at least one processor to:
   store, in a cache, write data received from a host directed to a storage volume managed by a storage controller;
   mirror the write data to a multi-ported NVM device, wherein the multi-ported NVM device is addressable by both the storage controller and a redundant controller, wherein the storage controller and the redundant controller concurrently mirror data to the multi-ported NVM device;

store the mirrored write data to a first partition of the multi-ported NVM device, the first partition comprising a metadata section and a content section; and store the mirrored write data to the storage volume after the storage controller mirrors the write data to the multi-ported NVM device.

9. The computing device of claim 8, wherein the redundant controller comprises a second cache, the redundant controller further to:

store second write data in the second cache;

mirror the second write data to the multi-ported NVM device; and store the mirrored second write data to a second partition of the multi-ported NVM device, the second partition being different from the first partition and comprising a second metadata section and a second content section.

10. The computing device of claim 9, the redundant controller further to:

transfer, in response to failure of the storage controller, ownership of the storage volume previously associated with the storage controller to the redundant controller.

11. The computing device of claim 10, the redundant controller further to:

receive a read request directed toward the storage volume previously associated with the failed storage controller; and serve the read request by checking the metadata section of the first partition of the multi-ported NVM device to determine whether there is a cache hit.

12. The computing device of claim 11, the redundant controller further to:

access read data identified by the read request from the content section of the first partition in response to determining that there is a cache hit;

cache the read data at the second cache of the redundant controller in response to reading the read data from the content section of the first partition of the multi-ported NVM device;

send the read data in response to the read request; and invalidate the read data in the first partition of the multi-ported NVM device in response to caching the read data at the second cache of the redundant controller.

13. The computing device of claim 10, further comprising a replacement controller to replace the failed storage controller, the replacement controller being coupled to the memory and comprising a third cache, the replacement controller to:

recover metadata and cache blocks previously associated with the failed storage controller from the first partition of the multi-ported NVM device, the recovered cache blocks comprising at least in part dirty data.

14. The computing device of claim 8, further comprising:

a communications bus configured to couple the multi-ported NVM device to the storage controller and the redundant controller.

15. A non-transitory machine readable medium having stored thereon instructions for performing a method comprising machine executable code which when executed by at least one machine, causes the at least one machine to:

receive a write request with write data from a host directed toward a storage volume associated with a storage controller of the machine;

cache, at a cache of the storage controller, the write data in response to receiving the write request;

mirror, by the storage controller, the write data to a nonvolatile memory ("NVM") device of the machine that is addressable by both the storage controller and a redundant controller of a storage server, wherein the storage controller and the redundant controller concurrently mirror data to the NVM device;

store the mirrored write data to a first partition of the NVM device, the first partition comprising a metadata section and a content section; and store the mirrored write data to the storage volume after the storage controller mirrors the write data to the multi-ported NVM device.

16. The non-transitory machine readable medium of claim 15, comprising further machine executable code which when executed by the at least one machine causes the at least one machine to:

store received second write data in a second cache of the redundant controller;

mirror the received second write data to the NVM device; and store the mirrored second write data to a second partition of the NVM device, the second partition being different from the first partition and comprising a second metadata section and a second content section.

17. The non-transitory machine readable medium of claim 16, comprising further machine executable code which when executed by the at least one machine causes the at least one machine to:

transfer, in response to failure of the storage controller, ownership of the storage volume previously associated with the storage controller to the redundant controller.

18. The non-transitory machine readable medium of claim 17, comprising further machine executable code which when executed by the at least one machine causes the at least one machine to:

receive a read request directed toward the storage volume previously associated with the failed storage controller; and serve the read request by checking the metadata section of the first portion partition of the NVM device to determine whether there is a cache hit.

19. The non-transitory machine readable medium of claim 18, comprising further machine executable code which when executed by the at least one machine causes the at least one machine to:

access read data identified by the read request from the content section of the first partition in response to determining that there is a cache hit; and cache the read data at the second cache of the redundant controller in response to reading the read data from the content section of the first partition of the NVM device.

20. The non-transitory machine readable medium of claim 19, comprising further machine executable code which when executed by the at least one machine causes the at least one machine to:

send the read data in response to the read request; and invalidate the read data in the first partition of the NVM device in response to caching the read data at the second cache of the redundant controller.

* * * * *